(12) United States Patent
Otsuka

(10) Patent No.: US 9,914,463 B2
(45) Date of Patent: Mar. 13, 2018

(54) AUTONOMOUS DRIVING DEVICE

(71) Applicant: TOYOTA JIDOSHA KABUSHIKI KAISHA, Toyota-shi, Aichi (JP)

(72) Inventor: Kohei Otsuka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 49 days.

(21) Appl. No.: 15/077,001

(22) Filed: Mar. 22, 2016

(65) Prior Publication Data
US 2016/0280236 A1    Sep. 29, 2016

(30) Foreign Application Priority Data

Mar. 23, 2015   (JP) ................................. 2015-059185

(51) Int. Cl.
*B60W 50/08*  (2012.01)
*B60W 10/20*  (2006.01)
(Continued)

(52) U.S. Cl.
CPC .......... *B60W 50/082* (2013.01); *B60W 10/04* (2013.01); *B60W 10/18* (2013.01);
(Continued)

(58) Field of Classification Search
CPC .... B60W 50/082; B60W 10/20; B60W 10/04; B60W 10/18; B60W 30/18154; B60W 50/10; B60W 2600/00; B60W 2420/52; B60W 2420/42; B60W 2550/143; B60W 2540/10; B60W 2550/40; G05D 1/0061; G05D 2201/0213
See application file for complete search history.

(56) References Cited

U.S. PATENT DOCUMENTS 5,469,356 A * 11/1995 Hawkins ................ G01C 21/26
                                                              318/591
5,684,696 A * 11/1997 Rao .................... B60K 31/0008
                                                              318/587
(Continued)

FOREIGN PATENT DOCUMENTS

DE   102010001581 A1   8/2011
EP       1275573 A2    1/2003
(Continued)

OTHER PUBLICATIONS

Communication dated Oct. 6, 2017, from the United States Patent and Trademark Office in counterpart U.S. Appl. No. 15/179,127.

*Primary Examiner* — Frederick M Brushaber
(74) *Attorney, Agent, or Firm* — Sughrue Mion, PLLC

(57) ABSTRACT

Disclosed is an autonomous driving device in which a threshold value for switching to manual driving which is used for switching the driving state from autonomous driving to manual driving with respect to a value indicative of a degree to which of any of a steering operation is carried out, an acceleration operation, and a braking operation by the driver is calculated by a calculation unit of the autonomous driving device according to the surrounding environment of the host vehicle recognized by an environment recognition unit. Thereby, the ease of switching the driving state from autonomous driving to manual driving conforms to a surrounding environment of the host vehicle.

18 Claims, 8 Drawing Sheets

(51) Int. Cl.
*B60W 10/04* (2006.01)
*B60W 10/18* (2012.01)
*B60W 30/18* (2012.01)
*B60W 50/10* (2012.01)
*G05D 1/00* (2006.01)

(52) U.S. Cl.
CPC ...... *B60W 10/20* (2013.01); *B60W 30/18154* (2013.01); *B60W 50/10* (2013.01); *G05D 1/0061* (2013.01); *B60W 2420/42* (2013.01); *B60W 2420/52* (2013.01); *B60W 2540/10* (2013.01); *B60W 2540/12* (2013.01); *B60W 2540/18* (2013.01); *B60W 2550/10* (2013.01); *B60W 2550/141* (2013.01); *B60W 2550/143* (2013.01); *B60W 2550/308* (2013.01); *B60W 2550/402* (2013.01); *B60W 2600/00* (2013.01); *G05D 2201/0213* (2013.01)

(56) References Cited

U.S. PATENT DOCUMENTS

| | | | | |
|---|---|---|---|---|
| 5,774,069 | A * | 6/1998 | Tanaka | B60T 7/12 180/167 |
| 5,906,645 | A * | 5/1999 | Kagawa | B60T 7/12 180/167 |
| 8,670,891 | B1 * | 3/2014 | Szybalski | B62D 1/286 701/23 |
| 9,342,074 | B2 * | 5/2016 | Dolgov | B60W 30/00 |
| 9,365,218 | B2 * | 6/2016 | Pallett | B60W 50/082 |
| 9,612,596 | B2 * | 4/2017 | Zwicky | B60W 50/14 |
| 9,637,120 | B2 * | 5/2017 | Laur | B60W 30/09 |
| 9,684,306 | B2 * | 6/2017 | Sprigg | G05D 1/0061 |
| 9,703,289 | B2 * | 7/2017 | Sato | G05D 1/0061 |
| 2007/0198145 | A1 * | 8/2007 | Norris | H04L 67/12 701/23 |
| 2010/0179715 | A1 * | 7/2010 | Puddy | G05D 1/0061 701/23 |
| 2010/0286847 | A1 * | 11/2010 | Cerchie | B64C 13/22 701/2 |
| 2011/0077028 | A1 * | 3/2011 | Wilkes, III | B60W 50/14 455/456.3 |
| 2012/0046817 | A1 * | 2/2012 | Kindo | G05D 1/0061 701/23 |
| 2014/0156133 | A1 | 6/2014 | Cullinane et al. | |
| 2014/0303827 | A1 * | 10/2014 | Dolgov | B60W 30/00 701/23 |
| 2015/0346724 | A1 * | 12/2015 | Jones | B60W 30/12 701/23 |
| 2016/0194003 | A1 * | 7/2016 | Torii | B60W 30/16 701/23 |
| 2016/0280236 | A1 * | 9/2016 | Otsuka | B60W 10/20 |
| 2016/0362116 | A1 * | 12/2016 | Otsuka | G05D 1/0061 |
| 2017/0003683 | A1 * | 1/2017 | Sato | G05D 1/0061 |

FOREIGN PATENT DOCUMENTS

| | | |
|---|---|---|
| JP | H06-298108 A | 10/1994 |
| JP | 2007-196809 A | 8/2007 |
| JP | 2012017717 A | 1/2012 |

* cited by examiner

AUTONOMOUS DRIVING DEVICE

CROSS REFERENCE TO RELATED APPLICATIONS

The disclosure of Japanese Patent Application No. JP 2015-059185 filed on Mar. 23, 2015 is incorporated herein by reference in its entirety.

TECHNICAL FIELD

Aspects of the present disclosure relate to an autonomous driving device.

BACKGROUND

In the related art, as disclosed in U.S. Pat. No. 8,670,891, an autonomous driving device is known, in which, when autonomous driving is executed in a host vehicle and pressure applied by a driver to a steering wheel, a brake or an accelerator is equal to or greater than a predetermined threshold value during the autonomous driving, the driving state is switched from autonomous driving to manual driving.

SUMMARY

There may be various environments such as obstacles around the host vehicle.

However, in U.S. Pat. No. 8,670,891, the switching of the driving state from autonomous driving to manual driving is performed in the same way according to the pressure applied by the driver to the steering wheel, brake or accelerator, regardless of the vehicle environment, and thus, the degree to which the driver is required to carry out a driving operation in order for switching of the driving state from autonomous driving to manual driving to take place does not take into account the surrounding environment of the host vehicle. Therefore, an improvement in this respect is desired.

Accordingly, an object of the present invention is to provide an autonomous driving device in which the degree to which the driver is required to carry out a driving operation in order for switching of the driving state from autonomous driving to manual driving to take place depends on the surrounding environment of the host vehicle.

According to an aspect of the present invention, there is provided an autonomous driving device configured to execute autonomous driving of a host vehicle, and switch a driving state from autonomous driving to manual driving when a value indicative of a degree to which any of a steering operation, an acceleration operation and a braking operation is carried out by a driver of the host vehicle during the autonomous driving is equal to or greater than a threshold value for switching to manual driving. The autonomous driving device includes: an operation amount acquisition unit configured to acquire the value indicative of the degree to which the driving operation is carried out during the autonomous driving; an environment recognition unit configured to recognize a surrounding environment of the host vehicle; a calculation unit configured to calculate the threshold value for switching to manual driving; and a control unit configured to execute autonomous driving, and to switch the driving state from autonomous driving to manual driving when the value indicative of the degree to which the operation is carried out is equal to or greater than the threshold value for switching to manual driving. The calculation unit is configured to calculate the threshold value for switching to manual driving according to the environment recognized by the environment recognition unit.

In this configuration, the threshold value for switching to manual driving which is used for switching the driving state from autonomous driving to manual driving with respect to the value indicative of an operation, such as a steering operation by the driver, is calculated by the calculation unit according to the surrounding environment of the host vehicle recognized by the environment recognition unit. Therefore, the degree to which the driver is required to carry out a driving operation in order for switching of the driving state from autonomous driving to manual driving to take place depends on the surrounding environment of the host vehicle.

In this case, the environment recognition unit may recognize an obstacle around the host vehicle as the environment, and the calculation unit may calculate a threshold value for switching to manual driving as being lower, the smaller a distance between an obstacle and a host vehicle.

In this configuration, as the distance between the obstacle and the host vehicle becomes closer, it becomes easier to switch the driving state from autonomous driving to manual driving, and thus, the ease of coping with the obstacle is improved.

In addition, the environment recognition unit may recognize an obstacle around the host vehicle as the environment, and if the distance between an obstacle and the host vehicle is a first distance and the obstacle is a pedestrian, the calculation unit may calculate the threshold value for switching to manual driving as being lower than the threshold value when the distance between the obstacle and the host vehicle is the first distance and the obstacle is another vehicle.

In this configuration, if the distances between the obstacle and the host vehicle are the same, the switching of the driving state from the autonomous driving to manual driving when the obstacle is the pedestrian is easier than switching when the obstacle is another vehicle, and thus, the ease of coping with the pedestrian is improved.

In addition, the environment recognition unit may recognize an obstacle around the host vehicle as the environment, and if the distance between the obstacle and the host vehicle is a second distance and the obstacle is a moving object, the calculation unit may calculate a threshold value for switching to manual driving as being lower than the threshold value when the distance between the obstacle and the host vehicle is the second distance and the obstacle is a stationary object.

In this configuration, if the distances between the obstacle and the host vehicle are the same, the switching of the driving state from the autonomous driving to manual driving when the obstacle is a moving object such as another vehicle or a pedestrian is easier than switching when the obstacle is the stationary object, and thus, the ease of coping with the moving object is improved.

In addition, the environment recognition unit may recognize a road width of a road on which the host vehicle is travelling as the environment, and the calculation unit may calculate a threshold value for switching to manual driving as being lower, the narrower the width of the road.

Alternatively, the environment recognition unit may recognize a road width of a road on which the host vehicle is travelling as the environment, and if the environment recognition unit does not recognize an obstacle, the calculation unit may calculate a threshold value for switching to manual driving as being lower, the narrower the width of the road.

In these configurations, regardless of the presence or absence of the recognition of the obstacle, as the road width becomes narrower, it becomes easier to switch the driving state from autonomous driving to manual driving, and thus, the ease of coping with the case of a narrow road width is improved.

In addition, the environment recognition unit may recognize whether or not the host vehicle is travelling on an intersection or a parking lot as the environment based on map information and position information of the host vehicle, and if the environment recognition unit recognizes that the host vehicle is travelling on an intersection or a parking lot, the calculation unit may calculate a threshold value for switching to manual driving which is lower than the threshold value when the environment recognition unit does not recognize that the host vehicle is travelling on an intersection or a parking lot.

Alternatively, the environment recognition unit may recognize whether or not the host vehicle is travelling on an intersection or a parking lot as the environment, based on map information and position information of the host vehicle, and if the environment recognition unit does not recognize the obstacle, and if the environment recognition unit recognizes that the host vehicle is travelling on an intersection or a parking lot, the calculation unit may calculate the threshold value for switching to manual driving as being lower than a threshold value when the environment recognition unit does not recognize that the host vehicle is travelling on an intersection or a parking lot.

In these configurations, regardless of the presence or absence of the recognition of the obstacle, it becomes easier to switch the driving state from autonomous driving to manual driving when the host vehicle is travelling on an intersection or a parking lot, and thus, the ease of coping with the case of the intersection or the parking lot is improved.

In the autonomous driving device, it is possible to make the degree to which the driver is required to carry out a driving operation in order for switching of the driving state from autonomous driving to manual driving to take place be more appropriate to the surrounding environment of the host vehicle.

DETAILED DESCRIPTION

Figure 1:
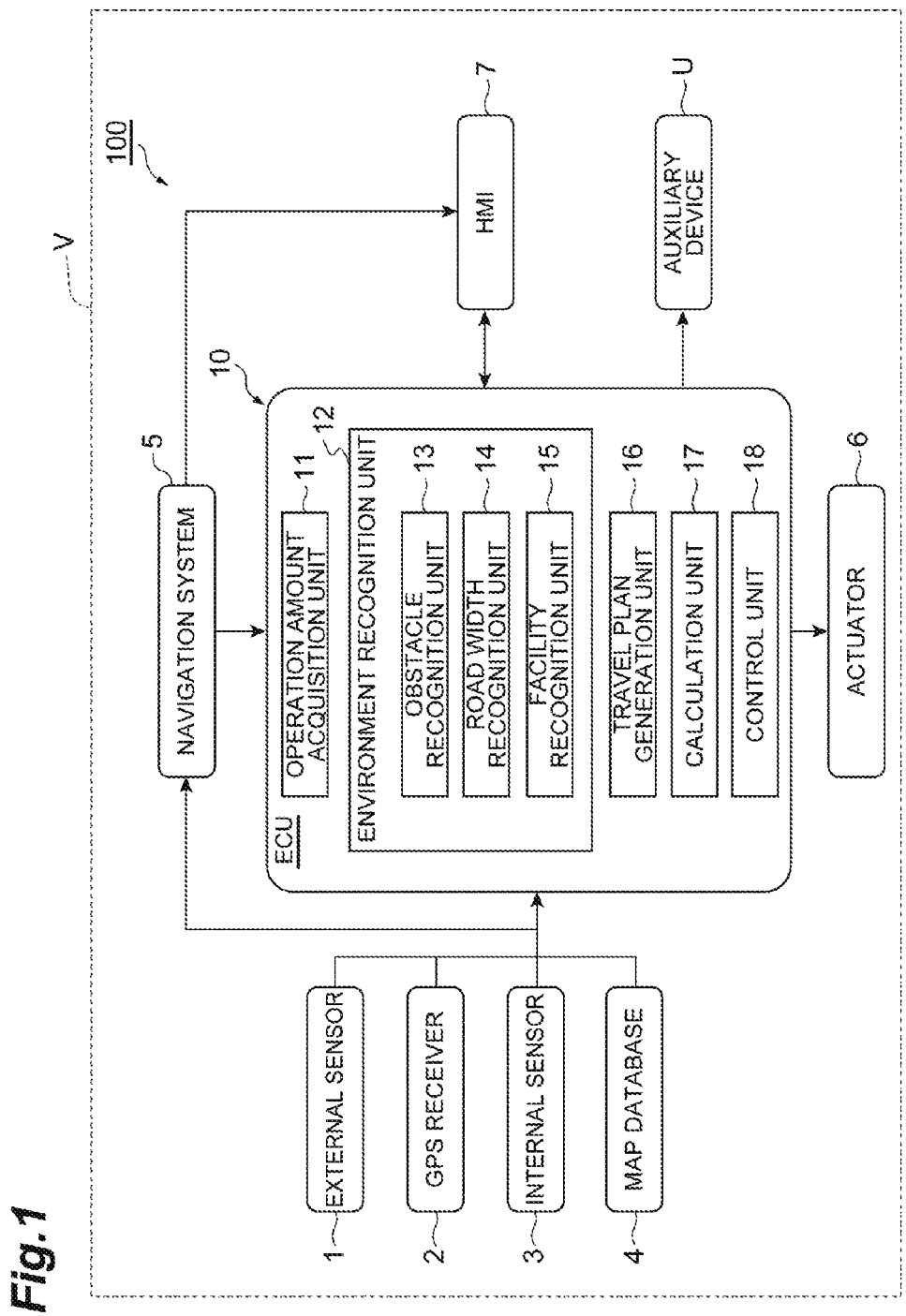
FIG. 1 is a block diagram illustrating a configuration of an autonomous driving device in the embodiment.

Hereinafter, exemplary embodiments of the present disclosure will be described with reference to the drawings. For example, in a first embodiment, as illustrated in FIG. 1, a vehicle driving device 100 is mounted on a host vehicle V such as a passenger car or the like. The vehicle driving device 100 executes autonomous driving of the host vehicle V. The autonomous driving means that the driving operation of the host vehicle V such as acceleration, deceleration, and steering are executed regardless of the driving operation by the driver of the host vehicle V. The autonomous driving device 100 in the first embodiment executes the autonomous driving of the host vehicle V, and when a value indicative of a degree to which any of the steering operation, acceleration operation, and braking operation is carried out by the driver during the autonomous driving by the driver of the host vehicle V is equal to or greater than a threshold value for switching to manual driving, the autonomous driving device 100 switches the driving state from autonomous driving to manual driving. The threshold value for switching to manual driving is the threshold value of a value indicative of a degree to which an operation is carried out by the driver that is used for switching the driving state from autonomous driving to manual driving with respect to the amount of any of the steering operation, acceleration operation, and braking by the driver of the host vehicle V.

As illustrated in FIG. 1, the autonomous driving device 100 includes an external sensor 1, a GPS (Global Positioning System) receiver 2, an internal sensor 3 a map database 4, a navigation system 5, an actuator 6, a HMI (Human Machine Interface) 7, an auxiliary device U, and an ECU 10.

The external sensor 1 is a detection device configured to detect an external situation which is peripheral information of the host vehicle V. The external sensor 1 includes at least one of a camera, radar, and laser imaging detection and ranging (LIDAR) system.

The camera is an imaging device for imaging an external situation of the host vehicle V. The camera is, for example, provided on the inside of a windshield of the host vehicle V. The camera may be a monocular camera or may be a stereo camera. The stereo camera has, for example, two imaging units that are arranged so as to reproduce a binocular parallax. The image information of the stereo camera also includes information on the depth direction. The camera outputs the image information relating to the external situation to the ECU 10 of the vehicle V. In addition, the camera may be an infrared camera or a visible light camera.

The radar detects an obstacle outside of the host vehicle V using a radio wave. The radio wave is, for example, a millimeter wave. The radar detects the obstacle by transmitting the radio wave to the surroundings of the host vehicle V and receiving the wave reflected from the obstacle. The radar outputs, for example, the distance or direction to the obstacle as obstacle information of the obstacle. The radar outputs detected obstacle information to the ECU 10. In a case of performing sensor fusion, the received information on the reflected radio wave may be output to the ECU 10.

The LIDAR detects the obstacle outside the host vehicle V using light. The LIDAR transmits the light to the surroundings of the host vehicle V, measures the distance to the reflection point by receiving the light reflected from the obstacle, and then, detects the obstacle. The LIDAR can output, for example, the distance or direction to the obstacle as the obstacle information of the obstacle. The LIDAR outputs the detected obstacle information to the ECU 10. In a case of performing sensor fusion, the received information on the reflected light may be output to the ECU 10. The camera, the LIDAR, and the radar are not necessarily provided in an overlapping manner.

The GPS receiver 2 receives signals from three or more GPS satellites and acquires position information indicating the position of the host vehicle V. The latitude and the longitude of the host vehicle V may be included in the position information. The GPS receiver 2 outputs the measured position information of the host vehicle V to the ECU 10. Instead of the GPS receiver 2, another means for specifying the latitude and the longitude at which the host vehicle V is present may be used.

The internal sensor 3 is a detection device configured to detect information corresponding to a travelling state of the host vehicle V and the amount of operation of any of the steering operation, the acceleration operation and the braking operation by the driver of the host vehicle V. In order to detect the information corresponding to the travelling state of the host vehicle V, the internal sensor 3 includes at least one of a vehicle speed sensor, an acceleration sensor, and a yaw rate sensor. In addition, in order to detect the amount of operation, the internal sensor 3 includes at least one of a steering sensor, an accelerator pedal sensor, and a brake pedal sensor.

The vehicle speed sensor is a detection device configured to detect the speed of the host vehicle V. As the vehicle speed sensor, for example, a wheel speed sensor is used, which is provided on vehicle wheels of the host vehicle V or a drive shaft and the like rotating integrally with vehicle wheels and detects a rotational speed of the vehicle wheels. The vehicle speed sensor outputs the vehicle speed information (vehicle wheel speed information) including the speed of the host vehicle V to the ECU 10.

The acceleration sensor is a detection device configured to detect an acceleration of the host vehicle V. The acceleration sensor includes, for example, a longitudinal acceleration sensor that detects acceleration in the longitudinal direction of the host vehicle V and a lateral acceleration sensor that detects a lateral acceleration of the host vehicle V. The acceleration sensor outputs acceleration information including the acceleration of the host vehicle V to the ECU 10.

The yaw rate sensor is a detection device of the host vehicle V configured to detect a yaw around the vertical axis of the center of gravity of the host vehicle V (rotational angular velocity). As the yaw rate sensor, for example, a gyro sensor can be used. The yaw rate sensor outputs yaw rate information including the yaw rate of the host vehicle V to the ECU 10.

The steering sensor is a detection device configured to detect, for example, the amount of operation of a steering operation with respect to the steering wheel by the driver. The amount of operation detected by the steering sensor is, for example, a steering angle of a steering wheel or a steering torque with respect to the steering wheel. The steering sensor is provided on, for example, the steering shaft of the host vehicle V. The steering sensor outputs information including the steering angle of the steering wheel and the steering torque with respect to the steering wheel to the ECU 10.

The accelerator pedal sensor is a detection device configured to detect, for example, an amount of depression of the accelerator pedal. The amount of depression of the accelerator pedal is a position (pedal position) of the accelerator pedal with a predetermined position as a reference, for example. The predetermined position may be a fixed position or may be a position that is changed by predetermined parameters. The accelerator pedal sensor is provided, for example, on the shaft portion of the accelerator pedal of the host vehicle V. The accelerator pedal sensor outputs operation information corresponding to the amount of depression to the accelerator pedal to the ECU 10.

The brake pedal sensor is a detection device configured to detect, for example, an amount of depression of the brake pedal. The amount of depression of the brake pedal is a position (pedal position) of the brake pedal with a predetermined position as a reference, for example. The predetermined position may be a fixed position or may be a position that is changed by predetermined parameters. The brake pedal sensor is provided, for example, on the shaft portion of the brake pedal. The brake pedal sensor may detect an operation force (taking into account a depression force on the accelerator pedal or the brake pedal or a pressure to a master cylinder, or the like). The brake pedal sensor outputs the operation information corresponding to the amount of depression or the operation force on the brake pedal to the ECU 10.

The map database 4 is a database in which map information is included. The map database 4 is formed, for example, in a hard disk drive (HDD) mounted on the host vehicle V. In the map information, for example, position information of roads, information on road types, and position information of intersections, and branch points are included. For example, type of a curve or a straight portion and a curvature of the curve are included in the information on the road type. Furthermore, when the autonomous driving device 100 uses the position information of a shielding structure such as a building or a wall and simultaneous localization and mapping technology (SLAM), the map information may include an output signal of the external sensor 1. The map database 4 may be stored in a computer in a facility such as an information processing center which is capable of communicating with host vehicle V.

The navigation system 5 is a device configured to perform guidance to a destination set on the map by a driver of the host vehicle V for a driver of the host vehicle V. The navigation system 5 calculates a travelling route of the host vehicle V based on the position information of the host vehicle V measured by the GPS receiver 2 and the map information in the map database 4. The route may be a route on which a travelling lane is specified, in which the host vehicle V travels in a multi-lane section, for example. The navigation system 5 calculates, for example, a target route from the position of the host vehicle V to the destination and performs notification to the driver by display on a display or a voice output of a speaker. The navigation system 5, for example, transmits the target route information of the host vehicle V to the ECU 10. The navigation system 5 may be stored in a computer in a facility such as an information processing center which is capable of communicating with host vehicle V. Alternatively, a part of processing performed by the navigation system 5 may be performed by the computer in the facility.

The actuator 6 is a device configured to perform a travel control of the host vehicle V. The actuator 6 includes at least a throttle actuator, a brake actuator, and a steering actuator. The throttle actuator controls a supply amount (throttle opening degree) of air to an engine according to the control signal from the ECU 10, and controls the driving force of the host vehicle V. When the host vehicle V is a hybrid vehicle or an electric vehicle, the throttle actuator is not included and the driving force is controlled by the control signal from the ECU 10 being input to a motor which is a source of the driving force.

The brake actuator controls a brake system according to the control signal from the ECU 10 and controls the braking force given to the wheels of the host vehicle V. For example, a hydraulic brake system can be used as the brake actuator. The steering actuator controls the driving of an assist motor that controls steering torque in the electric power steering system according to the control signal from the ECU 10. In this way, the steering actuator controls the steering torque of the host vehicle V.

The HMI 7 is an interface configured to perform an input and output of the information between the occupants (including the driver) of the host vehicle V and the autonomous driving device 100. The HMI 7 includes, for example, a display panel for displaying the image information for the occupant, a speaker for audio output, and an operation button or a touch panel for the occupant to perform the input operation. The HMI 7 may perform the outputting of the information to the occupants using a wirelessly connected mobile information terminal or may receive the input operation from the occupants using the mobile information terminal.

The auxiliary device U is a device that can be generally operated by the driver of the host vehicle V. The auxiliary device U is a device collectively referring to devices not included in the actuator 6. Here, the auxiliary device U includes, for example, a turn signal or hazards lamp, a headlight, a windshield wiper, and the like.

The ECU 10 controls the autonomous driving of the host vehicle V. The ECU 10 is an electronic control unit including a central processing unit (CPU), read only memory (ROM), random access memory (RAM), and the like. The ECU 10 includes an operation amount acquisition unit 11, an environment recognition unit 12, a travel plan generation unit 16, a calculation unit 17, and a control unit 18. In the ECU 10, the control of each unit such as the above-described operation amount acquisition unit 11 is performed by loading the program stored in the ROM into the RAM and executing the program by the CPU. The ECU 10 may be configured with a plurality of electronic control units, or may be a single electronic control unit.

The operation amount acquisition unit 11 acquires the amount of the steering operation, the acceleration operation and the braking operation by the driver of the host vehicle during the autonomous driving based on the information acquired by the internal sensor 3. The amount of operation is, for example, the steering angle of the steering wheel, the steering torque with respect to the steering wheel, the amount of depression on the accelerator pedal, the amount of depression on the brake pedal, or the operation force on the brake pedal. Alternatively, the amount of operation may be a duration of a state in which the steering angle of the steering wheel, the steering torque with respect to the steering wheel, the amount of depression on the accelerator pedal, the amount of depression on the brake pedal, or the operation force on the brake pedal is equal to or greater than a threshold value set in advance. The operation amount acquisition unit may also be configured as an operation amount acquirer.

The environment recognition unit 12 recognizes the surrounding environment of the host vehicle V based on the information acquired by one or more of the external sensor 1, the GPS receiver 2, and the map database 4. The environment recognition unit 12 includes an obstacle recognition unit 13, a road width recognition unit 14, and a facility recognition unit 15. The obstacle recognition unit 13 recognizes the obstacle around the host vehicle V as a status of the surrounding environment of the host vehicle V based on the information acquired by the external sensor 1. For example, a pedestrian, another vehicle, a moving object such as a motorcycle or a bicycle, a lane boundary line (lane line, yellow line), a stationary object such as a curb, a guardrail, a pole, a median strip, a building, or a tree may be included in obstacles recognized by the obstacle recognition unit 13. The obstacle recognition unit 13 acquires information on one or more of a distance between the obstacle and the host vehicle V, a position of the obstacle, a relative speed of the obstacle with respect to the host vehicle V, and a type of obstacle. The type of obstacle may be identified as a pedestrian, another vehicle, a moving object or a stationary object. The environment recognition unit may be configured as a environment recognizer. Furthermore, the obstacle recognition unit may be configured as an obstacle recognizer.

The road width recognition unit 14 recognizes a road width of the road on which the host vehicle V travels as the surrounding environment of the host vehicle V based on the information acquired by one or more of the external sensor 1, the GPS receiver 2, and the map database 4. The facility recognition unit 15 recognizes whether or not the host vehicle V travels on an intersection or a parking lot as the surrounding environment of the host vehicle V based on one or more of the map information acquired by the map database 4 and the position information of the host vehicle V acquired by the GPS receiver 2. The facility recognition unit 15 may recognize whether or not the host vehicle V travels on a school route, near a childcare facility, near a school, or near a park, for example, as the surrounding environment of the host vehicle V based on the map information and position information of the host vehicle V. The road width recognition unit may be configured as a road width recognizer. Furthermore, the facility recognition unit may be configured as a facility recognizer.

The travel plan generation unit 16 generates a travel plan for the host vehicle V based on the information on the target route calculated by the navigation system 5, the information of the obstacle around the host vehicle V recognized by the environment recognition unit 12, and the map information acquired by the map database 4. The travel plan is a trajectory of the host vehicle V on the target route. For example, a speed, an acceleration, a deceleration, a direction, and a steering angle of the host vehicle V may be included in the travel plan. The travel plan generation unit 16 generates a travel plan such that the host vehicle V can travel while satisfying standards such as a safety, regulatory compliance, and driving efficiency on the target route. Furthermore, the travel plan generation unit 16 generates a travel plan for the host vehicle V so as to avoid contact with an obstacle based on the situation of the obstacle around the host vehicle V.

The calculation unit 17 calculates the threshold value for switching to manual driving according to the surrounding environment of the host vehicle V recognized by the environment recognition unit 12. As described below, when the obstacle is recognized by the obstacle recognition unit 13 of the environment recognition unit 12, the calculation unit 17 may calculate the threshold value for switching to manual driving according to the distance between the obstacle and the host vehicle and the type of obstacle. In addition, when the obstacle is not recognized by the obstacle recognition unit 13 of the environment recognition unit 12, the calculation unit 17 may calculate the threshold value for switching to manual driving according to one or more of the road width of the road on which the host vehicle V travels and a type of facilities such as a parking lot on which the host vehicle V travels. As described below, a function describing the threshold value for switching to manual driving corresponding to the surrounding environment of the host vehicle V is stored in the ECU 10. The calculation unit 17 may be configured as a calculator.

The control unit 18 automatically controls the travelling of the host vehicle V based on the travel plan generated by the travel plan generation unit 16. The control unit 18 outputs a control signal corresponding to the travel plan to the actuator 6. In this way, the control unit 18 controls the travelling of the host vehicle V such that the autonomous driving of the host vehicle V can be executed according to the travel plan. In addition, when the amount of operation acquired by the operation amount acquisition unit 11 is equal to or greater than the threshold value for switching to manual driving calculated by the calculation unit 17, the control unit 18 can switch the driving state from autonomous driving to manual driving. The control unit may be configured as a controller.

Figure 2:
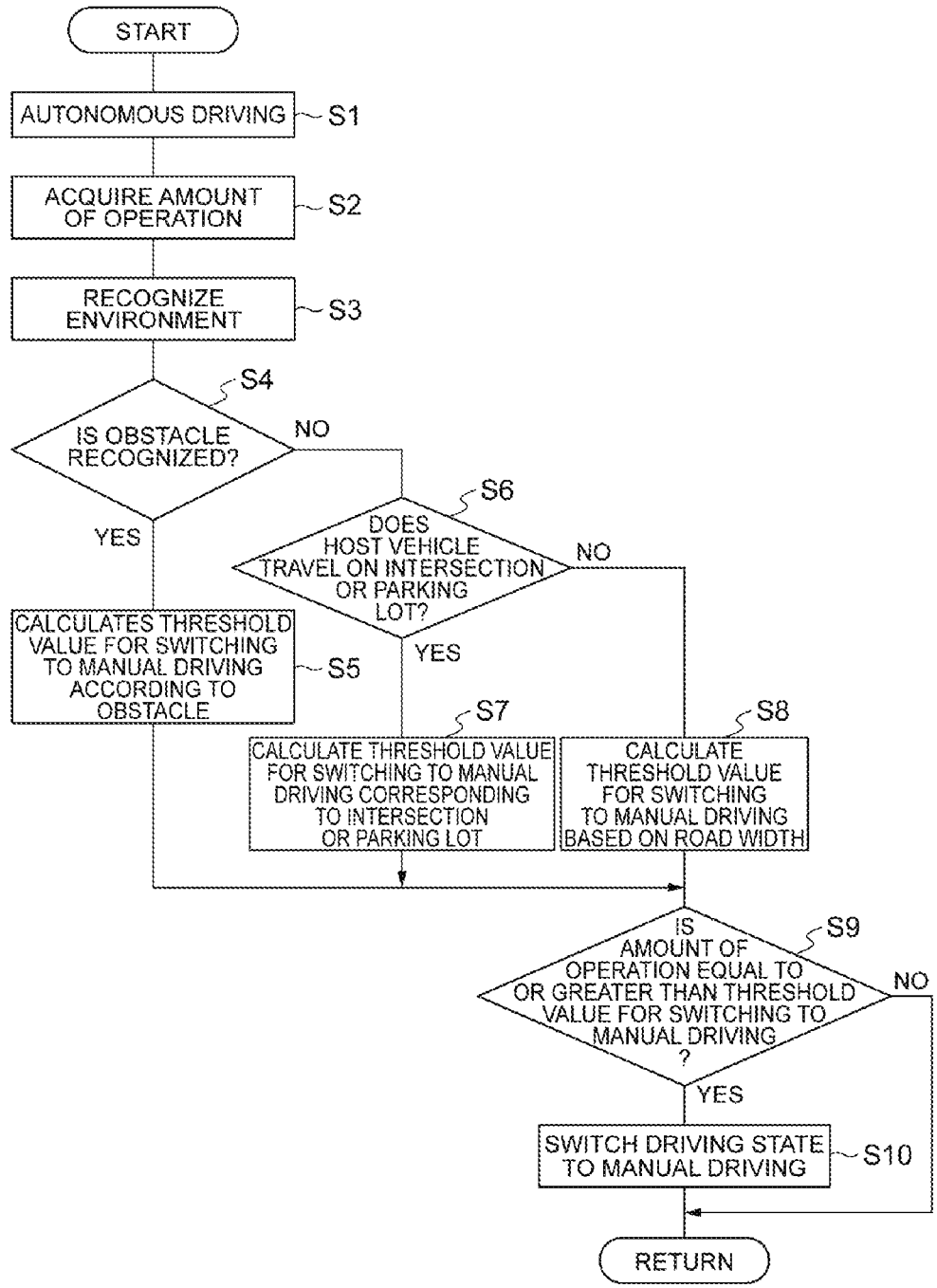
FIG. 2 is a flowchart illustrating an operation of the autonomous driving device in FIG. 1.

Next, the processing executed by the autonomous driving device 100 will be described. As illustrated in FIG. 2, the control unit 18 of the ECU 10 executes the autonomous driving of the host vehicle V based on the travel plan generated by the travel plan generation unit 16 (S1). In starting the autonomous driving, for example, when an ignition of the host vehicle V is turned ON, the control unit 18 determines whether autonomous driving can be executed or not based on the surrounding environment of the host vehicle V recognized by the external sensor 1 and the environment recognition unit 12 of the ECU 10. When it is determined that autonomous driving can be executed, the control unit 18 notifies the occupants though the HMI 7 of the fact that autonomous driving can be executed. By the occupant performing a predetermined input operation to the HMI 7, the autonomous driving device 100 starts autonomous driving. The operation amount acquisition unit 11 of the ECU 10 acquires the amount of any of the steering operation, the acceleration operation and the braking operation by the driver of the host vehicle V during the autonomous driving (S2).

The environment recognition unit 12 recognizes the surrounding environment of the host vehicle V (S3). When the obstacle recognition unit 13 of the environment recognition unit 12 recognizes an obstacle around the host vehicle V as information relating to a status of the surrounding environment of the host vehicle V (S4), the calculation unit 17 calculates the threshold value for switching to manual driving corresponding to the obstacle (S5). The obstacle recognition unit 13 of the environment recognition unit 12 may recognize a presence or position, for example, of the obstacle as information relating to the status of the surrounding environment.

Figure 3:
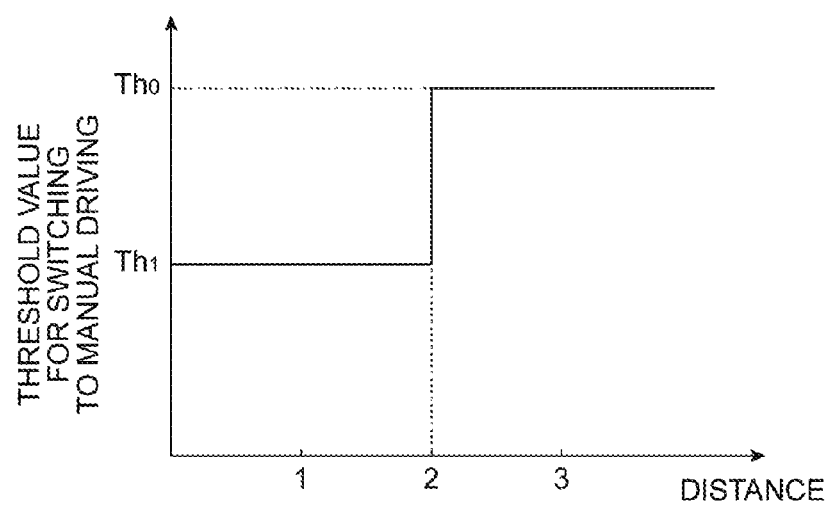
FIG. 3 is a graph illustrating a threshold value for switching to manual driving, which changes stepwise with respect to a distance to an obstacle.

Hereinafter, the calculation of the threshold value for switching to manual driving corresponding to the obstacle by the calculation unit 17 will be described. For example, a function describing the threshold value for switching to manual driving with respect to the distance between the obstacle and the host vehicle V as illustrated in FIG. 3 is stored in the ECU 10. In the example in FIG. 3, when the distance between the obstacle and the host vehicle V exceeds a value of 2, the calculation unit 17 calculates a threshold value for switching to manual driving $Th_0$ which is a reference of the threshold value for switching to manual driving. On the other hand, when the distance between the obstacle and the host vehicle V is equal to or less than 2, the calculation unit 17 calculates a threshold value for switching to manual driving $Th_1$ which is lower than $Th_0$. In the above example, the function describing the threshold value for switching to manual driving with respect to the distance between the obstacle and the host vehicle V comprises a stepwise function.

Figure 4:
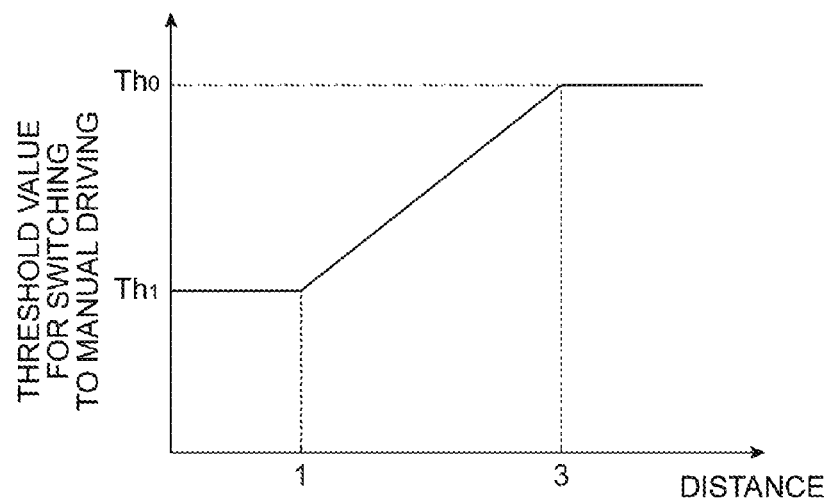
FIG. 4 is a graph illustrating the threshold value for switching to manual driving, which linearly changes with respect to the distance to the obstacle.

In addition, a function describing the threshold value for switching to manual driving with respect to the distance between the obstacle and the host vehicle V as illustrated in FIG. 4 may be stored in the ECU 10. In the example in FIG. 4, when the distance between the obstacle and the host vehicle V exceeds a value of 3, the calculation unit 17 calculates a threshold value for switching to manual driving $Th_0$ which is a reference of the threshold value for switching to manual driving. When the distance between the obstacle and the host vehicle V is equal to or less than 1, the calculation unit 17 calculates a threshold value for switching to manual driving $Th_1$ which is lower than $Th_0$. When the distance between the obstacle and the host vehicle V is equal to or lower than 3 and exceeds 1, the calculation unit 17 calculates a threshold value for switching to manual driving which linearly decreases from the threshold value for switching to manual driving $Th_0$ at the time when the distance is 3 to the threshold value for switching to manual driving $Th_1$ at the time when the distance is 1 as the distance between the obstacle and the host vehicle V becomes smaller. In the above example, the function describing the threshold value for switching to manual driving with respect to the distance between the obstacle and the host vehicle V comprises a linear function. However, a non-linear function may be included in which the rate of decrease from the threshold value for switching to manual driving $Th_0$ at the time when the distance is 3 to the threshold value for switching to manual driving $Th_1$ at the time when the distance is 1 increases or decreases as the distance becomes closer to 1 or 3.

Figure 5:
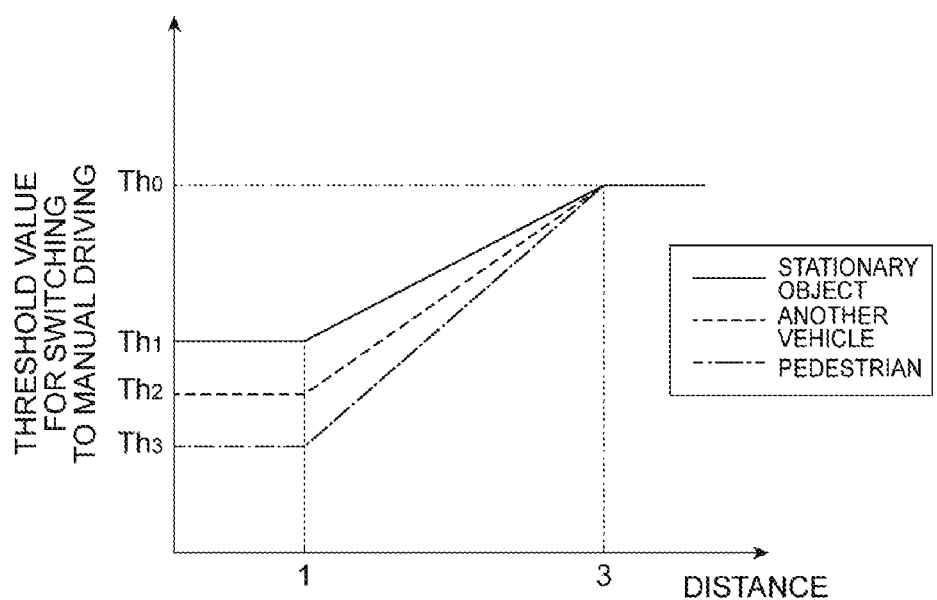
FIG. 5 is a graph illustrating the threshold value for switching to manual driving with respect to the distance to the obstacle and a type of the obstacle.

Furthermore, a function describing the threshold value for switching to manual driving with respect to the distance between the obstacle and the host vehicle V as illustrated in FIG. 5 may be stored in the ECU 10. In the example in FIG. 5, when the distance between the obstacle and the host vehicle V exceeds a value of 3, the calculation unit 17 calculates a threshold value for switching to manual driving $Th_0$ which is the reference of the threshold value for switching to manual driving regardless of the type of the obstacle. In FIG. 3 to FIG. 5, a unit of the distance can be a meter [m], and when the amount of operation by the driver relates to a steering operation, a unit of the threshold value for switching to manual driving $Th_0$ can be a degree [°] which indicates the steering angle. The units mentioned above are merely exemplary, and, for example, a unit of a different scale or an index could be used alternatively. Furthermore, particular values are mentioned above, but such values are merely examples of a predetermined value which may be set appropriately.

When the distance between the obstacle and the host vehicle V is equal to or less than 3 and exceeds 1 and the obstacle is a stationary object such as a lane line or a guardrail, the calculation unit 17 calculates a threshold value for switching to manual driving which linearly decreases from the threshold value for switching to manual driving $Th_0$ at the time when the distance is 3 to the threshold value for switching to manual driving $Th_1$ at the time when the distance is 1. When the distance between the obstacle and the host vehicle V is equal to or less than 3 and exceeds 1 and the obstacle is another vehicle, the calculation unit 17 calculates a threshold value for switching to manual driving which linearly decreases from the threshold value for switching to manual driving $Th_0$ at the time when the distance is 3 to the threshold value for switching to manual driving $Th_2$ which is lower than $Th_1$ at the time when the distance is 1. When the distance between the obstacle and the host vehicle V is equal to or less than 3 and exceeds 1 and the obstacle is a pedestrian, the calculation unit 17 calculates a threshold value for switching to manual driving which linearly decreases from the threshold value for switching to manual driving $Th_0$ at the time when the distance is 3 to the threshold value for switching to manual driving $Th_3$ which is lower than $Th_2$ at the time when the distance is 1. When the distance between the obstacle and the host vehicle V is equal to less than 1, the calculation unit 17 calculates the threshold value for switching to manual driving $Th_1$ when the obstacle is a stationary object, calculates the threshold value for switching to manual driving $Th_2$ when the obstacle is another vehicle, and calculates the threshold value for switching to manual driving $Th_3$ when the obstacle is a pedestrian.

That is, when the distance between the obstacle and the host vehicle V is equal to or less than 3 and the obstacle is a pedestrian, the calculation unit 17 calculates a threshold value for switching to manual driving which is lower than the threshold value for switching to manual driving when the obstacle is another vehicle with respect to the same distance between the obstacle and the host vehicle V (a first distance). In addition, when the distance between the obstacle and the host vehicle V is equal to or less than 3 and the obstacle is a moving object such as a pedestrian or another vehicle, the calculation unit 17 calculates a threshold value for switching to manual driving which is lower than the threshold value for switching to manual driving when the obstacle is a stationary object such as a lane line or a guardrail with respect to the same distance between the obstacle and the host vehicle V (a second distance).

As illustrated in FIG. 2, when the obstacle recognition unit 13 does not recognize an obstacle around the host vehicle V (S4) and the facility recognition unit 15 of the environment recognition unit 12 recognizes that the host vehicle V travels on an intersection or parking lot (S6) as information relating to a status of the surrounding environment of the host vehicle V, the calculation unit 17 calculates the threshold value for switching to manual driving corresponding to the intersection and the parking lot recognized by the facility recognition unit 15 (S7). The facility recognition unit 15 can recognize the fact that, for example, the host vehicle V travels on an intersection by detecting a blinking of a traffic signal using the external sensor 1 or by the information acquired by the GPS receiver 2 and the map database 4. In addition, the facility recognition unit 15 can recognize the fact that the host vehicle V travels on a parking lot by detecting external signs, such as a mark "P", using the external sensor 1 or by the information acquired by the GPS receiver 2 and the map database 4.

As illustrated in FIG. 2, even when the obstacle recognition unit 13 does not recognize an obstacle around the host vehicle V (S4) and the facility recognition unit 15 of the environment recognition unit 12 does not recognize that the host vehicle V travels on an intersection or a parking lot (S6) as information relating to a status of the surrounding environment of the host vehicle V, the calculation unit 17 may calculate the threshold value for switching to manual driving based on the road width recognized by the road width recognition unit 14 of the environment recognition unit 12 (S8).

Figure 6:
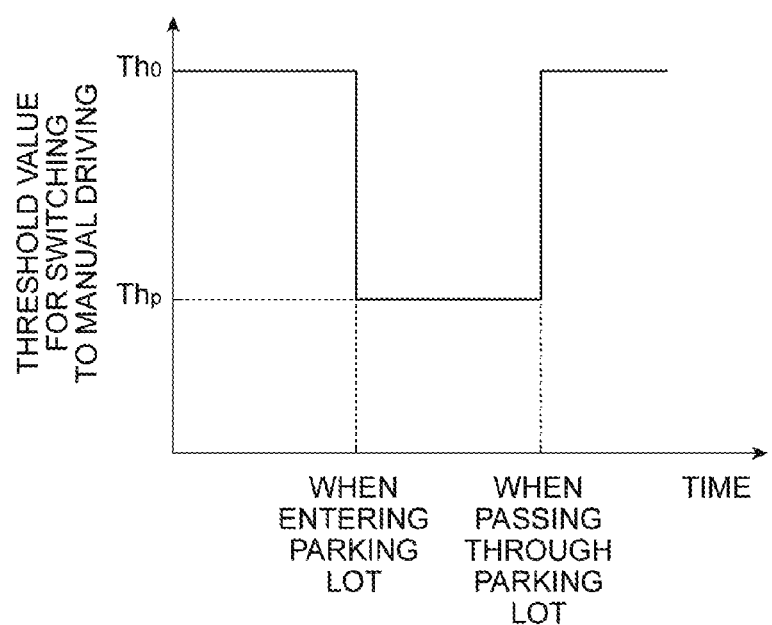
FIG. 6 is a graph illustrating the threshold value for switching to manual driving during travelling in a parking area.

A function describing the threshold value for switching to manual driving with respect to the parking lot scenario illustrated in FIG. 6, for example, is stored in the ECU 10. In the example in FIG. 6, before the host vehicle V enters the parking lot and after passing through the parking lot, the calculation unit 17 calculates a threshold value for switching to manual driving $Th_0$ which is a reference of the threshold value for switching to manual driving. On the other hand, when the host vehicle V travels in the parking lot, the calculation unit 17 calculates a threshold value for switching to manual driving $Th_p$ which is lower than $Th_0$.

Figure 7:
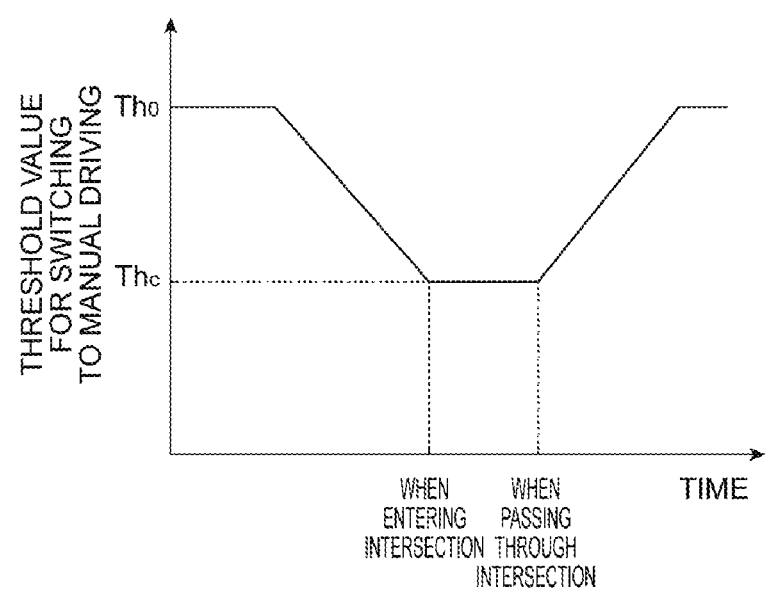
FIG. 7 is a graph illustrating the threshold value for switching to manual driving during travelling on an intersection.

Alternatively, a function of the threshold value for switching to manual driving with respect to the intersection scenario illustrated in FIG. 7, for example, is stored in the ECU 10. In the example in FIG. 7, at a predetermined time before the host vehicle V enters the intersection and at a predetermined time after passing through the intersection, the calculation unit 17 calculates a threshold value for switching to manual driving $Th_0$ which is a reference of the threshold value for switching to manual driving. When the host vehicle V travels in the intersection, the calculation unit 17 calculates a threshold value for switching to manual driving $Th_c$ which is lower than $Th_0$.

During the time from a predetermined time before the host vehicle V enters the intersection to a time when the host vehicle V enters the intersection, the calculation unit 17 calculates a threshold value for switching to manual driving which linearly decreases from the threshold value for switching to manual driving $Th_0$ to the threshold value for switching to manual driving $Th_c$ as the host vehicle V becomes closer to the intersection. During the time from when the host vehicle V passes through the intersection to a time when a predetermined time has elapsed, the calculation unit 17 calculates a threshold value for switching to manual driving which linearly increases from the threshold value for switching to manual driving $Th_c$ to the threshold value for switching to manual driving $Th_0$ as the host vehicle V moves away from the intersection. In a similar manner, the calculation unit 17 can calculate a threshold value for switching to manual driving when the host vehicle V travels on a school route, near a childcare facility, near a school, and near a park. Although the above examples have been described with respect to a functional relationship between the threshold value for switching to manual driving and time, the relationship may be based on a distance or a positional relationship with respect to the intersection.

Figure 8:
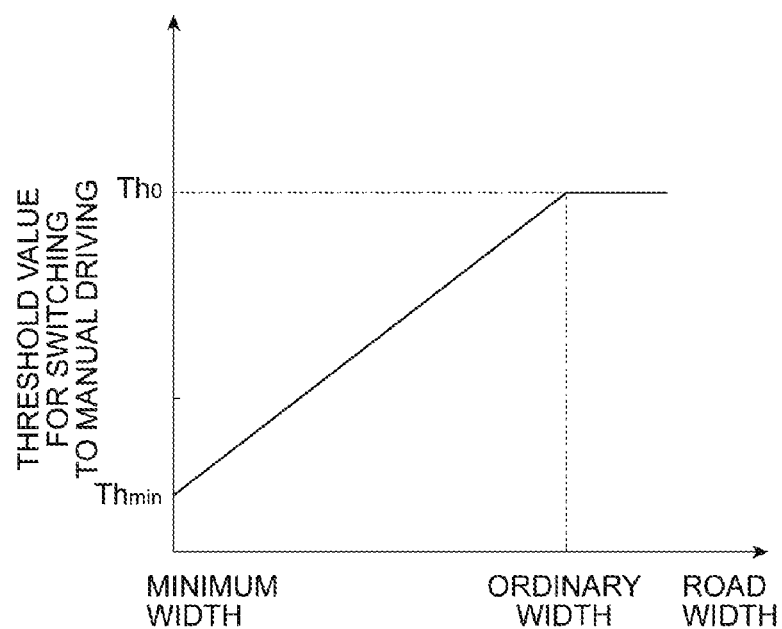
FIG. 8 is a graph illustrating the threshold value for switching to manual driving with respect to a road width.

A function describing the threshold value for switching to manual driving with respect to the road width illustrated in FIG. 8, for example, is stored in the ECU 10. In the example in FIG. 8, when the road width exceeds an ordinary width, the calculation unit 17 calculates a threshold value for switching to manual driving $Th_0$ which is the reference of the threshold value for switching to manual driving. When the road width is a minimum width in which the host vehicle V can travel, the calculation unit 17 calculates a threshold value for switching to manual driving $Th_{min}$ which is a minimum value of the threshold value for switching to manual driving. When the road width is equal to or less than the ordinary width and exceeds the minimum width, the calculation unit 17 calculates a threshold value for switching to manual driving which linearly decreases from the threshold value for switching to manual driving $Th_0$ of the ordinary width to the threshold value for switching to manual driving $Th_{min}$ of the minimum width as the road width becomes narrower. The calculation unit 17 may calculate the threshold value for switching to manual driving $Th_0$ based on a vehicle-width of the host vehicle V registered in the ECU 10 in advance or a general road width registered in the ECU 10 or in the map database 4 in advance. In addition, in FIG. 8, a unit of the road width can be a meter [m], and when the amount of operation by the driver relates to the steering operation, a unit of the threshold value for switching to manual driving $Th_O$ can be a degree [°] which indicates the steering angle.

As illustrated in FIG. 2, when the amount of operation is equal to or greater than the threshold value for switching to manual driving (S9), the control unit 18 switches the driving state from autonomous driving to manual driving (S10). On the other hand, when the amount of operation is less than the threshold value for switching to manual driving (S9), the control unit 18 continues to execute the autonomous driving.

According to the first embodiment, the threshold value for switching to manual driving which is used for switching the driving state from autonomous driving to manual driving with respect to the amount of operation such as the steering operation by the driver is calculated by the calculation unit 17 according to the surrounding environment of the host vehicle V recognized by the environment recognition unit 12. Therefore, the amount of intervention of the driving operation by the driver for switching the driving state from autonomous driving to manual driving conforms to the surrounding environment of the host vehicle.

In addition, as the distance between the obstacle and the host vehicle V becomes smaller, it becomes easier to switch the driving state from autonomous driving to manual driving, and thus, the ease of coping with the obstacle is improved. In addition, when the obstacle is any of another vehicle or a pedestrian, and if the distances between the obstacle and the host vehicle are the same in the two cases, the switching of the driving state from the autonomous driving to manual driving when the obstacle is a pedestrian is easier than that in the other case, and thus, the ease of coping with the pedestrian is improved. That is, the switching of the driving state from the autonomous driving to the manual driving may be prioritized based on the type of the obstacle. In addition, when the obstacle is any of a stationary object and a moving object, and if the distances between the obstacle and the host vehicle are the same in the two cases, the switching of the driving state from the autonomous driving to manual driving when the obstacle is a moving object is easier than that in the other case, and thus, the ease of coping with the moving object is improved. That is, the switching of the driving state from the autonomous driving to the manual driving may be prioritized based on the movement state of the obstacle.

In addition, according to the first embodiment, regardless of the presence or absence of the recognition of an obstacle, as the road width becomes narrower, it becomes easier to switch the driving state from autonomous driving to manual driving, and thus, the ease of coping with the case of a narrow road width is improved. In addition, regardless of the presence or absence of the recognition of an obstacle, it becomes easier to switch the driving state from autonomous driving to manual driving when the host vehicle V travels on an intersection or a parking lot, and thus, the ease of coping with the case of the intersection or the parking lot is improved.

As set forth above, some exemplary embodiments of the present disclosure are described. However, the present invention is not limited to the above-described embodiments, but may be embodied in various aspects. For example, even when the environment recognition unit 12 does not recognize the above-described obstacle or the like as the surrounding environment of the host vehicle V, the environment recognition unit 12 may recognize the weather or an amount of light, and then, the calculation unit 17 may calculate a lower threshold value for switching to manual driving as the weather becomes worse or the amount of light becomes less.

In addition, the environment recognition unit 12 may not include all of the obstacle recognition unit 13, the road width recognition unit 14 and the facility recognition unit 15, and may not execute all of the processing tasks in FIG. 2. For example, any one or a plurality of configuration elements among the obstacle recognition unit 13, the road width recognition unit 14 and the facility recognition unit 15 may be omitted from the environment recognition unit 12. When the road width recognition unit 14 and the facility recognition unit 15 are omitted from the environment recognition unit 12, the calculation unit 17 may execute only the processing tasks of S4 and S5. In addition, when the obstacle recognition unit 13 and the road width recognition unit 14 are omitted from the environment recognition unit 12, the calculation unit 17 may execute only the processing tasks of S6 and S7 after the processing of S3, and may not execute the processing of S8. In addition, when the obstacle recognition unit 13 and the facility recognition unit 15 are omitted from the environment recognition unit 12, the calculation unit 17 may execute only the processing of S8 after the processing of S3, and may not execute the processing tasks of S4 to S7.

In addition, when the road width recognition unit 14 is omitted from the environment recognition unit 12, the calculation unit 17 may execute only the processing tasks of S6 and S7 when the obstacle is not recognized in the processing of S4, and may not execute the processing of S8. In addition, when the facility recognition unit 15 is omitted from the environment recognition unit 12, the calculation unit 17 may execute only the processing of S8 when the obstacle is not recognized in the processing of S4, and may not execute the processing tasks of S6 and S7. In addition, when the obstacle recognition unit 13 is omitted from the environment recognition unit 12, the calculation unit 17 may execute only the processing tasks of S6 to S8 after the processing of S3, and may not execute the processing tasks of S4 and S5.

Furthermore, when the environment recognition unit 12 includes the obstacle recognition unit 13, the obstacle recognition unit 13 may recognize any of the distance between the obstacle and the host vehicle V and the type of the obstacle, and then, the calculation unit 17 may calculate the threshold value for switching to manual driving according only to any of the distance between the obstacle and the host vehicle V and the type of the obstacle. In addition, when the obstacle recognition unit 13 recognizes the type of the obstacle and the calculation unit 17 calculates the threshold value for switching to manual driving according to the type of the obstacle, the obstacle recognition unit 13 may recognize only any of whether the obstacle is a pedestrian and another vehicle and whether the obstacle is a moving object or a stationary object, and then, the calculation unit 17 may calculate the threshold value for switching to manual driving according to only any of whether the obstacle is a pedestrian or another vehicle and whether the obstacle is a moving object or a stationary object.

Furthermore, when the environment recognition unit 12 includes the obstacle recognition unit 13, the road width recognition unit 14 and the facility recognition unit 15, the processing tasks shown in FIG. 2 may be rearranged, such that, for example, the processing S4 may take place at the position of S6, and so on.

In addition, the control unit 18 may switch the driving state between: autonomous driving in which the travelling of the host vehicle V is controlled using the travel plan generated by the travel plan generation unit 16; semi-autonomous driving in which the travelling of the host vehicle V is controlled based on both the travel plan generated by the travel plan generation unit 16, and any of the amount of the steering operation, the acceleration operation and the braking operation by the driver of the host vehicle; and manual driving in which any of the amount of the steering operation, the acceleration operation and the braking operation by the driver of the host vehicle V is reflected in the travelling of the host vehicle V, based on any of the amount of the steering operation, the acceleration operation and the braking operation by the driver of the host vehicle V. In this case, when any of the amount of steering operation, the acceleration operation and the braking operation by the driver of the host vehicle V during autonomous driving is equal to or greater than a first threshold value, the control unit 18 switches the driving state from autonomous driving to semi-autonomous driving, and when any of the amount of steering operation, the acceleration operation and the braking operation by the driver of the host vehicle V during the semi-autonomous driving is equal to or greater than a second threshold value which is greater than the first threshold value, the control unit 18 switches the driving state from semi-autonomous driving to manual driving. The calculation unit 17 can calculate the first threshold value and the second threshold value by a method similar to that of calculating the threshold value for switching to manual driving described above.

What is claimed is:

1. An autonomous driving device configured to execute autonomous driving of a host vehicle, and switch a driving state from autonomous driving to manual driving when a value indicative of a degree to which any of a steering operation, an acceleration operation and a braking operation is carried out by a driver of the host vehicle during the autonomous driving is equal to or greater than a threshold value for switching to manual driving, the device comprising:
   an operation amount acquirer configured to acquire the value indicative of a degree to which the operation is carried out during the autonomous driving;
   an environment recognizer configured to recognize a status of a surrounding environment of the host vehicle;
   a calculator configured to calculate the threshold value for switching to manual driving; and
   a controller configured to execute autonomous driving, and to switch the driving state from autonomous driving to manual driving when the value indicative of the degree to which the operation is carried out is equal to or greater than the threshold value for switching to manual driving,
   wherein the calculator is configured to calculate the threshold value for switching to manual driving according to the status of the surrounding environment recognized by the environment recognizer,
   wherein the environment recognizer is configured to recognize an obstacle around the host vehicle as information relating to the status of the surrounding environment, and
   wherein the calculator is configured to calculate the threshold value for switching to manual driving which becomes lower when a distance between the obstacle and the host vehicle becomes smaller.

2. The autonomous driving device according to claim 1, wherein
   the calculator is configured to calculate the threshold value for switching to manual driving as a function of the distance between the obstacle and the host vehicle, the function comprising:
   when the distance between the obstacle and the host vehicle is equal to or less than a first distance threshold, the calculator calculates the threshold value for switching to manual driving as a first threshold value; and
   when the distance between the obstacle and the host vehicle exceeds a second distance threshold, the calculator calculates the threshold value for switching to manual driving as a second threshold value,
   wherein the second threshold value is larger than the first threshold value.

3. The autonomous driving device according to claim 2, wherein
   the function comprises a stepwise function, and
   the first distance threshold and the second distance threshold are equal.

4. The autonomous driving device according to claim 2, wherein
   the first distance threshold is less than the second distance threshold, and
   the function comprises:
   when the distance between the obstacle and the host vehicle is equal to or lower than the second distance threshold and exceeds the first distance threshold, the calculator calculates the threshold value for switching to manual driving which decreases from the second threshold value to the first threshold value as the distance between the obstacle and the host vehicle becomes smaller.

5. The autonomous driving device according to claim 4, wherein
   when the distance between the obstacle and the host vehicle is equal to or lower than the second distance threshold and exceeds the first distance threshold, the calculator calculates the threshold value for switching to manual driving which linearly decreases from the second threshold value to the first threshold value as the distance between the obstacle and the host vehicle becomes smaller.

6. The autonomous driving device according to claim 4, wherein
   when the distance between the obstacle and the host vehicle is equal to or lower than the second distance threshold and exceeds the first distance threshold, the calculator calculates the threshold value for switching to manual driving which non-linearly decreases from the second threshold value to the first threshold value as the distance between the obstacle and the host vehicle becomes smaller.

7. The autonomous driving device according to claim 1, wherein the environment recognizer is configured to further recognize a type of the obstacle around the host vehicle as information relating to the status of the surrounding environment, and
   wherein, when the distance between the obstacle and the host vehicle is a first distance and the obstacle is a pedestrian, the calculator is configured to calculate a threshold value for switching to manual driving as being lower than the threshold value when the distance between the obstacle and the host vehicle is the first distance and the obstacle is another vehicle.

8. The autonomous driving device according to claim 1, wherein the environment recognizer is configured to further recognize movement state of the obstacle around the host vehicle as information relating to the status of the surrounding environment, and wherein, when the distance between the obstacle and the host vehicle is a first distance and the obstacle is a moving object, the calculator is configured to calculate the threshold value for switching to manual driving as being lower than the threshold value when the distance between the obstacle and the host vehicle is the first distance and the obstacle is a stationary object.

9. The autonomous driving device according to claim 1, wherein the environment recognizer is further configured to recognize a road width of a road on which the host vehicle is travelling as information relating to the status of the surrounding environment, and wherein, when the environment recognizer does not recognize an obstacle, the calculator is configured to calculate a threshold value for switching to manual driving which is lower, the narrower the width of the road.

10. The autonomous driving device according to claim 9, wherein the calculator is configured to calculate the threshold value for switching to manual driving as a function of the road width, the function comprising:

when the road width is a first width corresponding to a minimum width in which the host vehicle can travel, which is a predetermined value based on a size of the vehicle, the calculator calculates the threshold value for switching to manual driving as a first threshold value;

when the road width exceeds a second width, the calculator calculates the threshold value for switching to manual driving as a second threshold value;

when the road width is equal to or less than the second width and exceeds the first width, the calculator calculates the threshold value for switching to manual driving which linearly decreases from the second threshold value to the first threshold value as the road width becomes narrower.

11. The autonomous driving device according to claim 1, wherein the environment recognizer is configured to recognize whether or not the host vehicle is travelling on an intersection or a parking lot as information relating to the status of the surrounding environment based on one or more of map information and position information of the host vehicle, and wherein, when the environment recognizer does not recognize the obstacle, and when the environment recognizer recognizes that the host vehicle is travelling on the intersection or the parking lot, the calculator is configured to calculate the threshold value for switching to manual driving as being lower than the threshold value when a case where the environment recognizer does not recognize that the host vehicle is travelling on the intersection or the parking lot.

12. The autonomous driving device according to claim 11, wherein the calculator is configured to calculate the threshold value for switching to manual driving as a function of time relative to when the host vehicle enters any of the intersection and the parking lot.

13. An autonomous driving device configured to execute autonomous driving of a host vehicle, and switch a driving state from currently executed autonomous driving to manual driving when an amount of any of a steering operation, an acceleration operation and a braking operation by the driver of the host vehicle during the autonomous driving is equal to or greater than a threshold value for switching to manual driving, the device comprising:

an operation amount acquirer configured to acquire the amount of operation during the autonomous driving;

an environment recognizer configured to recognize a status of a surrounding environment of the host vehicle;

a calculator configured to calculate the threshold value for switching to manual driving; and a controller configured to execute the autonomous driving, and switch the driving state from currently executed autonomous driving to manual driving when the amount of the operation is equal to or greater than the threshold value for switching to manual driving, wherein the calculator is configured to calculate the threshold value for switching to manual driving according to the status of the surrounding environment recognized by the environment recognizer, wherein the environment recognizer is configured to recognize presence of an obstacle around the host vehicle and a type of the obstacle as information relating to the status of the surrounding environment, and wherein, when the distance between the obstacle and the host vehicle is a first distance and the obstacle is a pedestrian, the calculator is configured to calculate the threshold value for switching to manual driving as being lower than the threshold value when the distance between the obstacle and the host vehicle is the first distance and the obstacle is another vehicle.

14. An autonomous driving device configured to execute autonomous driving of a host vehicle, and switch a driving state from currently executed autonomous driving to manual driving when an amount of any of a steering operation, and acceleration operation and a braking operation by the driver of the host vehicle during the autonomous driving is equal to or greater than a threshold value for switching to manual driving, the device comprising:

an operation amount acquirer configured to acquire the amount of operation during the autonomous driving;

an environment recognizer configured to recognize a status of a surrounding environment of the host vehicle;

a calculator configured to calculate the threshold value for switching to manual driving; and a controller configured to execute the autonomous driving, and switch the driving state from currently executed autonomous driving to manual driving when the amount of operation is equal to or greater than the threshold value for switching to manual driving, wherein the calculator is configured to calculate the threshold value for switching to manual driving according to the status of the surrounding environment recognized by the environment recognizer, wherein the environment recognizer is configured to recognize an obstacle around the host vehicle and movement state of the obstacle as information relating to the status of the surrounding environment, and wherein, when the distance between the obstacle and the host vehicle is a first distance and the obstacle is a moving object, the calculator is configured to calculate the threshold value for switching to manual driving as being lower than the threshold value when the distance between the obstacle and the host vehicle is the first distance and the obstacle is a stationary object.

15. An autonomous driving device configured to execute autonomous driving of a host vehicle, and switch a driving state from currently executed autonomous driving to manual driving when an amount of any of a steering operation, an acceleration operation and a braking operation by the driver of the host vehicle du ins the autonomous driving is equal to or greater than a threshold value for switching to manual driving, the device comprising:
- an operation amount acquirer configured to acquire the amount of operation during the autonomous driving;
- an environment recognizer configured to recognize a status of a surrounding environment of the host vehicle;
- a calculator configured to calculate the threshold value for switching to manual driving; and
- a controller configured to execute the autonomous driving, and switch the driving state from currently executed autonomous driving to manual driving when the amount of operation is equal to or greater than the threshold value for switching to manual driving,
- wherein the calculator is configured to calculate the threshold value for switching to manual driving according to the status of the surrounding environment recognized by the environment recognizer,
- wherein the environment recognizer is configured to recognize a road width of a road on which the host vehicle is travelling as information relating to the status of the surrounding environment, and
- wherein the calculator is configured to calculate a threshold value for switching to manual driving as being lower, the narrower the width of the road.

16. The autonomous driving device according to claim 15, wherein
- the calculator is configured to calculate the threshold value for switching to manual driving as a function of the road width, the function comprising:
  - when the road width is a first width corresponding to a minimum width in which the host vehicle can travel, which is a predetermined value based an a size of the vehicle, the calculator calculates the threshold value for switching to manual driving as a first threshold value;
  - when the road width exceeds a second width, the calculator calculates the threshold value for switching to manual driving as a second threshold value;
  - when the road width is equal to or less than the second width and exceeds the first width, the calculator calculates the threshold value for switching to manual driving which linearly decreases from the second threshold value to the first threshold value as the road width becomes narrower.

17. An autonomous driving device configured, to execute autonomous driving of a host vehicle, and switch a driving state from currently executed autonomous driving to manual driving when an amount of any of a steering operation, an acceleration operation and a braking operation by the driver of the host vehicle during the autonomous driving is equal to or greater than a threshold value for switching to manual driving, the device comprising:
- an operation amount acquirer configured to acquire the amount of operation during the autonomous driving;
- an environment recognizer configured to recognize a status of a surrounding environment of the host vehicle;
- a calculator configured to calculate the threshold value for switching to manual driving? and
- a controller configured to execute the autonomous driving and switch the driving state from currently executed autonomous driving to manual driving when the amount of operation is equal to or greater than the threshold value for switching to manual driving,
- wherein the calculator is configured to calculate the threshold value for switching to manual driving according to the status of the surrounding environment recognized by the environment recognizer,
- wherein the environment recognizer is configured to recognize whether or not the host vehicle is travelling on an intersection or a parking lot as information relating to the status of the surrounding environment based on one or more of map information and position information of the host vehicle, and
- wherein, when the environment recognizer recognizes that the host vehicle is travelling on the intersection and the parking lot, the calculator is configured to calculate the threshold value for switching to manual driving as being lower than the threshold value when the environment recognizer does not recognize that the host vehicle is travelling on the intersection or the parking lot.

18. The autonomous driving device according to claim 17, wherein
- the calculator is configured to calculate the threshold value for switching to manual driving as a function of time relative to when the host vehicle enters any of the intersection and the parking lot.

* * * * *